(12) United States Patent
Barnette et al.

(10) Patent No.: US 8,754,669 B2
(45) Date of Patent: Jun. 17, 2014

(54) DYNAMIC IMPEDANCE MATCHING FOR IMPROVED TRANSIENT PERFORMANCE IN A DIRECT CURRENT-TO-DIRECT CURRENT ('DC/DC') CONVERTER FOR DELIVERING A LOAD TO AN ELECTRICAL COMPONENT

(71) Applicant: International Business Machines Corporation, Armonk, NY (US)

(72) Inventors: Jamaica L. Barnette, Durham, NC (US); Bobby J. Hemingway, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/673,206

(22) Filed: Nov. 9, 2012

(65) Prior Publication Data

US 2014/0132237 A1     May 15, 2014

(51) Int. Cl.
*H03K 19/003*     (2006.01)

(52) U.S. Cl.
USPC ............................................. 326/30; 330/254

(58) Field of Classification Search
USPC ......... 323/222, 225, 247, 266–267, 280–288; 363/16–17, 21.12, 21.17, 37, 39, 41, 363/96, 97, 98; 290/44, 55; 326/26, 27, 30, 326/80, 86, 99, 87; 330/54, 147, 261, 144
See application file for complete search history.

(56) References Cited

U.S. PATENT DOCUMENTS

| | | | |
|---|---|---|---|
| 4,447,866 A | 5/1984 | Reeves | |
| 5,063,488 A | 11/1991 | Harada et al. | |
| 5,068,776 A | 11/1991 | Polivka | |
| 5,373,432 A | 12/1994 | Vollin et al. | |
| 5,418,702 A | 5/1995 | Marinus et al. | |
| 5,477,858 A * | 12/1995 | Norris et al. | 600/441 |
| 5,479,087 A * | 12/1995 | Wright | 323/267 |
| 5,694,302 A | 12/1997 | Faulk | |
| 6,466,459 B1 | 10/2002 | Guerrera | |
| 6,552,565 B2 * | 4/2003 | Chang et al. | 326/30 |
| 6,636,430 B1 * | 10/2003 | Batarseh et al. | 363/21.01 |
| 6,815,937 B2 * | 11/2004 | Poon et al. | 323/282 |
| 6,834,002 B2 | 12/2004 | Yang | |
| 7,528,625 B2 * | 5/2009 | Ozasa et al. | 326/30 |
| 8,208,878 B1 * | 6/2012 | Hardy et al. | 455/127.5 |
| 2011/0090716 A1 | 4/2011 | Asuke et al. | |
| 2011/0248812 A1 | 10/2011 | Hu et al. | |
| 2012/0002446 A1 | 1/2012 | Madawala et al. | |

OTHER PUBLICATIONS

Steiner, et al., "A Tuning Transformer for the Automatic Adjustment of Resonant Loop Antennas in RFID Systems", 2004 IEEE International Conference on Industrial Technology (IEEE ICIT '04), Dec. 2004, pp. 912-916, IEEE, Digital Object Identifier: 10.1109/ICIT.2004.1490196.

Wegleiter, et al., "Automatic Antenna Tuning Unit to Improve RFID System Performance", IEEE Transactions on Instrumentation and Measurement, May 2011, pp. 2797-2803 (section III), vol. 60, Issue 8, IEEE, Digital Object Identifier: 10.1109/TIM.2011.2122390.

* cited by examiner

*Primary Examiner* — Rajnikant Patel
(74) *Attorney, Agent, or Firm* — Brandon C. Kennedy; Katherine S. Brown; Biggers Kennedy Lenart Spraggins LLP

(57) ABSTRACT

A direct current-to-direct current ('DC/DC') converter for delivering a load to an electrical component, the DC/DC converter including: a coupled inductor, wherein the coupled inductor receives a source input voltage level and a outputs an output voltage level; a transient winding; and a variable impedance switch coupled to the transient winding, the variable impedance switch configured to operate by adjusting a delivered resistance level in dependence upon a change in the load to be delivered to the electrical component by the DC/DC converter.

4 Claims, 4 Drawing Sheets

*Prior Art*

Prior Art DC-DC Converter
100

DYNAMIC IMPEDANCE MATCHING FOR IMPROVED TRANSIENT PERFORMANCE IN A DIRECT CURRENT-TO-DIRECT CURRENT ('DC/DC') CONVERTER FOR DELIVERING A LOAD TO AN ELECTRICAL COMPONENT

BACKGROUND OF THE INVENTION

1. Field of the Invention

The field of the invention is data processing, or, more specifically, methods, apparatus, and products for dynamic impedance matching for improved transient performance in a direct current-to-direct current ('DC/DC') converter for delivering a load to an electrical component.

2. Description of Related Art

Modern direct current-to-direct current ('DC/DC') converters utilize coupled inductors to reduce the effective inductance of the system when the DC/DC converter is delivering a constant load, thereby reducing power loss in the system. When the load to be delivered changes, however, low levels of inductance in the system can cause higher current ripples to filter by an output capacitor bank in the DC/DC convertor.

FIG. 1, for example, sets forth a prior art DC/DC converter that includes an indirectly coupled inductor. The example DC/DC converter (100) of FIG. 1 includes two power-switching phases (132, 134). Each phase includes two switches: a high-side switch (102, 106), and a low-side switch (104, 108). Each high-side switch (102, 106) includes a control input (110, 114) to activate the switch. Upon activation, each high-side switch (102, 106) couples a voltage source ($V_{IN}$) to an indirectly coupled inductor (118). Each low-side switch (104, 108) also includes a control input (112, 116) to activate the switch. Upon activation, each low-side switch (104, 108) couples one coil of indirectly coupled inductor (118) to a ground voltage.

Coupled inductors come in two forms: indirectly coupled and directly coupled. The dots depicted in the example of FIG. 1 indicate the coupled inductor (118) is an indirectly coupled inductor. The dot convention specifies the flow of current in a coupled inductor as: when current flows 'into' one dot, current is induced in the alternate coil of the coupled inductor and flows 'out of' the other dot. Thus, in an indirectly coupled inductor, current generally flows in the same direction in both coils of the coupled inductor. The example prior art DC/DC converter (100) of FIG. 1 also includes an output capacitor (120) that operates as a lowpass filter and a load, represented by a resistor (122).

The example prior art DC/DC converter (100) of FIG. 1 can deliver power to one or more electrical components. The load to be delivered to an electrical component that is coupled to the DC/DC converter (100) may change. For example, the load to be delivered to an electrical component that is coupled to the DC/DC converter (100) may change when the electrical component powers up or powers down. Consider an example in which the DC/DC converter (100) is part of a mobile communications device. In such an example, the DC/DC converter (100) may be coupled to a battery that powers the mobile communications device. When a user of the mobile communications device ceases using the device, the user may click a button, switch, or otherwise cause the mobile communications device to enter into a power conservation state where various components of the mobile communications device (e.g., a touch screen display) are in a powered down state. In such an example, the load to be delivered to by the DC/DC converter (100) may decrease when the user forces the device into a hibernation mode. Likewise, when a user of the mobile communications device brings the device out of a powered down state by, for example, clicking a button that causes the touch screen display to turn on, the load to be delivered by the DC/DC converter (100) may increase. A change in the load to be delivered by a DC/DC converter (100) is referred to herein as a 'transient event.'

The occurrence of a transient event may trigger unintended consequences. Consider an example in which the load to be delivered by the DC/DC converter (100) decreases significantly. Once the load transitions from a higher load to a smaller load, energy stored in the inductor (118) is dumped into an output capacitor (120) that serves as a filter in the DC/DC converter (100). If the capacitor (120) is inadequate, the output charge stored in the inductor (118) could ramp up the output voltage of the DC/DC converter (100), thereby causing the DC/DC converter (100) to deliver a voltage to a computing component that is outside of desired specifications.

SUMMARY OF THE INVENTION

A direct current-to-direct current ('DC/DC') converter for delivering a load to an electrical component, the DC/DC converter including: a coupled inductor, wherein the coupled inductor receives a source input voltage level and a outputs an output voltage level; a transient winding; and a variable impedance switch coupled to the transient winding, the variable impedance switch configured to operate by adjusting a delivered resistance level in dependence upon a change in the load to be delivered to the electrical component by the DC/DC converter.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
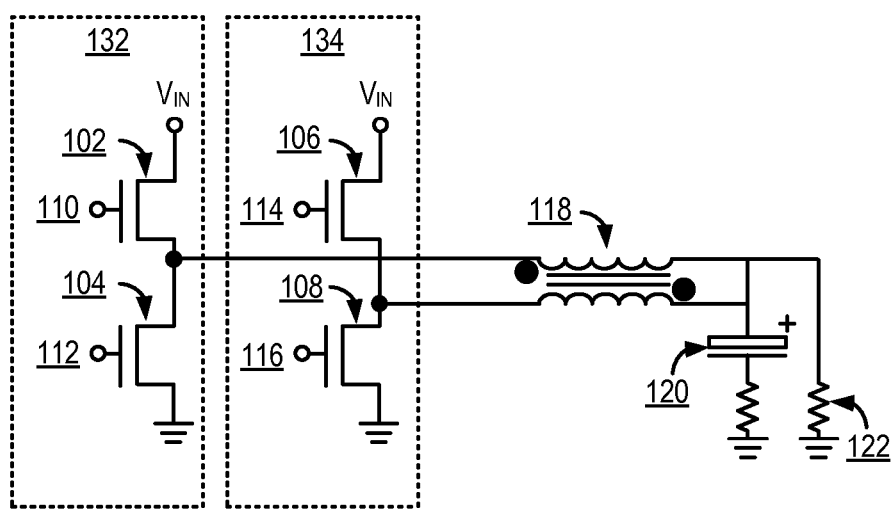
FIG. 1 sets forth a prior art DC/DC converter that includes an indirectly coupled inductor.
Figure 2:
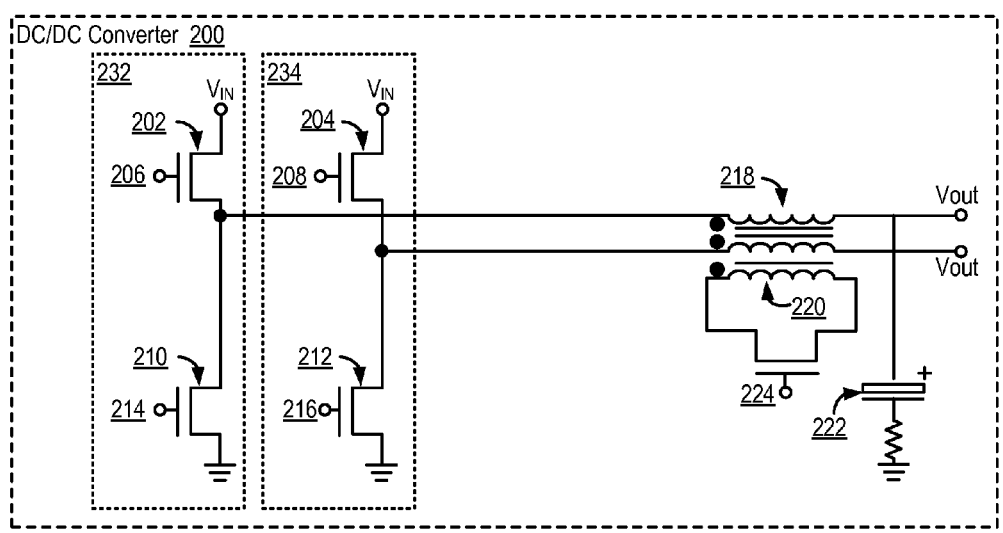
FIG. 2 sets forth a diagram of a DC/DC converter for delivering a load to an electrical component according to embodiments of the present invention.

Example methods and apparatus for dynamic impedance matching for improved transient performance in a direct current-to-direct current ('DC/DC') converter for delivering a load to an electrical component in accordance with the present invention are described with reference to the accompanying drawings, beginning with FIG. 2. FIG. 2 sets forth a diagram of a DC/DC converter (200) for delivering a load to an electrical component according to embodiments of the present invention. The DC/DC converter (200) of FIG. 2 may be embodied as an electronic circuit which converts a source of DC from one voltage level to another voltage level. The DC/DC converter (200) of FIG. 2 may be included in computing devices such as, for example, mobile communications devices, laptop computers, tablet computers, and the like. The DC/DC converter (200) of FIG. 2 may be configured, for example, to receive power from a source of electrical power such as a battery and deliver power to components within the computing device.

The DC/DC converter (200) includes two power-switching phases (232, 234). Each power-switching phase (232, 234) includes a high-side switch (202, 204), and a low-side switch (210, 212). Each high-side switch (202, 204) includes a control input (206, 208) to activate the switch. Upon activation, each high-side switch (202, 204) couples a voltage source ($V_{IN}$) to a directly coupled inductor (218). Each low-side switch (210, 212) also includes a control input (214, 216) to activate the switch. Upon activation, each low-side switch (210, 212) couples one coil of the directly coupled inductor (218) to a ground voltage.

The DC/DC converter (200) of FIG. 2 includes a coupled inductor (218). The dots depicted in the example of FIG. 2 indicate the coupled inductor (218) is a directly coupled inductor. The dot convention specifies the flow of current in a coupled inductor as such that when current flows 'into' one dot, current is induced in the alternate coil of the coupled inductor and flows 'out of' the other dot. Thus, in a directly coupled inductor, current generally flows in the opposite direction in both coils of the coupled inductor. In the example of FIG. 2, the coupled inductor (218) can receive a source input voltage level, for example, from the power-switching phases (232, 234) via a voltage source ($V_{IN}$). The coupled inductor (218) can also output an output voltage level, for example, from a voltage output ($V_{OUT}$).

The DC/DC converter (200) of FIG. 2 also includes a transient winding (220). In the example of FIG. 2, the transient winding (220) may be embodied, for example, as a separate inductor on a separate core. In such an example, the core of the transient winding (220) and the core of the inductor (218) may be aligned such that magnetic flux energy flows through either core such that the cores behave as a single core. The transient winding (220) of FIG. 2 can be utilized to impact the amount of energy that is discharged by the coupled inductor (218) as the amount of energy that is discharged by the coupled inductor (218) is dependent upon the impedance of the transient winding (220) as explained in more detail below.

Under ideal conditions, during a transient event the internal inductance of the DC/DC converter (200) would be as low as possible. Such a low level of inductance can be referred to as the 'leakage inductance.' For the DC/DC converter (200) of FIG. 2, the open loop inductance of the system can be determined by measuring the inductance of one winding of the coupled inductor (218) while all other windings are open and in a high impedance condition. The leakage inductance of the DC/DC converter (200) of FIG. 2 can be measured when one of the windings of the coupled inductor (218) is shorted and in a low impedance condition.

In the example of FIG. 2, current flowing through the coupled inductor (218) induces a negative current through the transient winding (220). The current induced through the transient winding (220), however, is impacted by the impedance of the transient winding (220). As such, the amount of energy that is discharged by the coupled inductor (218) is also dependent upon the impedance of the transient winding (220). When the impedance of the transient winding (220) is high, the coupled inductor (218) operates at an open loop inductance. When the impedance of the transient winding (220) is low, the coupled inductor (218) operates at a leakage inductance. The impedance level of the transient winding (220) therefore can be used to control the inductance level of the coupled inductor (218).

The DC/DC converter (200) of FIG. 2 also includes a variable impedance switch (224) coupled to the transient winding (220). The variable impedance switch (224) of FIG. 2 may be embodied as an electrical component that implements electrical impedance as a circuit element. For example, the variable impedance switch (224) of FIG. 2 may be embodied as a variable resistor, where the amount of electrical impedance introduced into the circuit formed by the transient winding (220) and variable impedance switch (224) can be varied. The variable impedance switch (224) of FIG. 2 may alternatively be embodied as a metal-oxide-semiconductor field-effect transistor ('MOSFET') for switching electronic signals such that the amount of electrical impedance can be varied from very high to very low as the switch may be opened or closed.

The variable impedance switch (224) of FIG. 2 is configured to operate by adjusting a delivered impedance level in dependence upon a change in the load to be delivered to the electrical component by the DC/DC converter (200). As described above, under ideal conditions the internal inductance of the DC/DC converter (200) would be as low as possible during a transient event as a low level of inductance allows for good dynamic performance and a faster slew rate when transitioning from delivering a load of a first amount to delivering a load of a second amount. As such, the impedance level of variable impedance switch (224) can be decreased to drive down inductance in the DC/DC converter (200) when a change in the load to be delivered to the electrical component by the DC/DC converter (200) occurs. Likewise, the impedance level of variable impedance switch (224) can be increased to drive up inductance in the DC/DC converter (200) when the DC/DC converter (200) is operating at steady-state, such that the DC/DC converter (200) operates with maximum efficiency.

Figure 3:
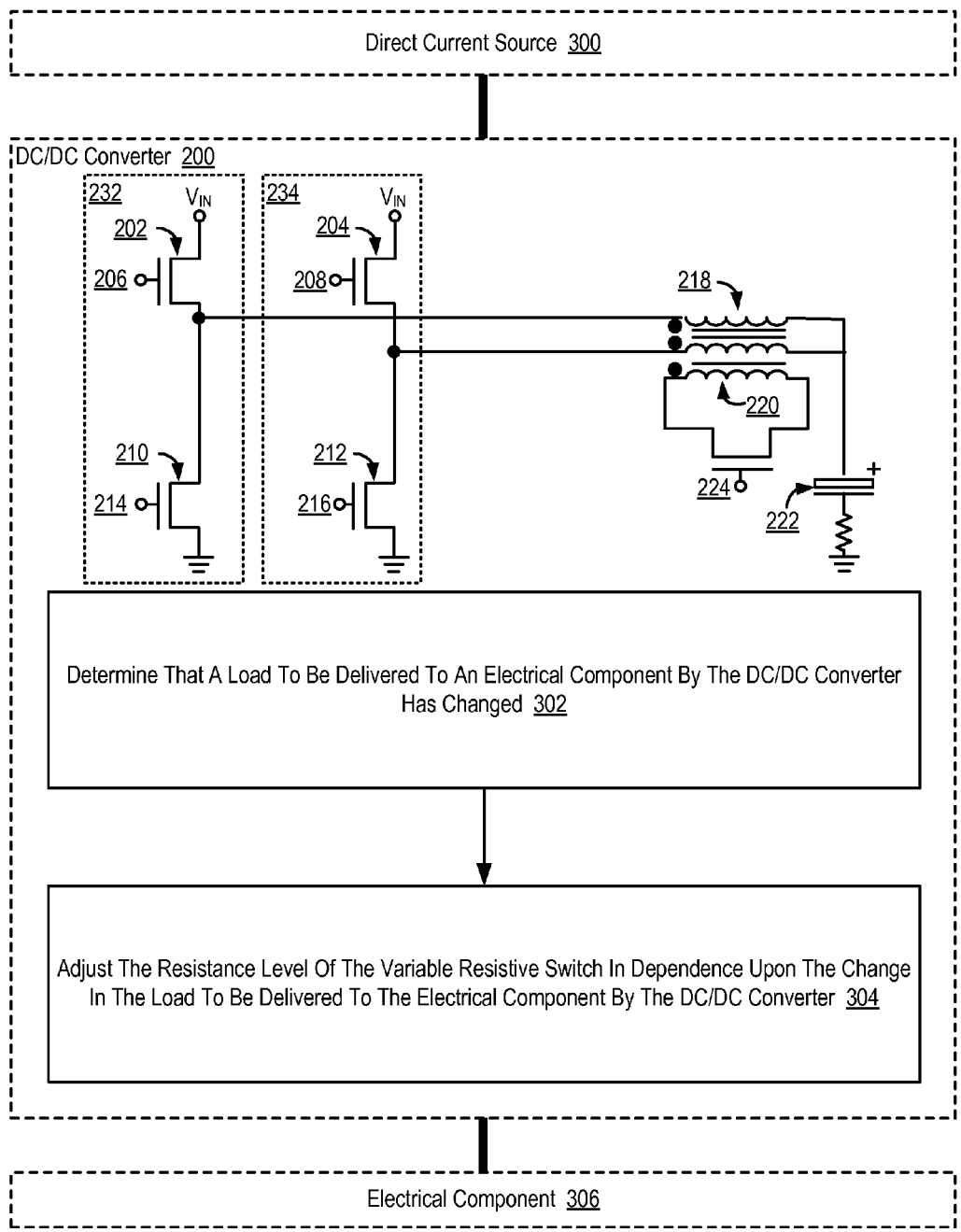
FIG. 3 sets forth a flow chart illustrating an example method for dynamic impedance matching for improved transient performance in a DC/DC converter for delivering a load to an electrical component according to embodiments of the present invention.

For further explanation, FIG. 3 sets forth a flow chart illustrating an example method for dynamic impedance matching for improved transient performance in a DC/DC converter (200) for delivering a load to an electrical component (306) according to embodiments of the present invention. The example method of Figure is carried out in a DC/DC converter (200) that is similar to the DC/DC converter (200) depicted in FIG. 2 and described above.

The DC/DC converter (200) of FIG. 3 includes two power-switching phases (232, 234). Each power-switching phase (232, 234) includes a high-side switch (202, 204), and a low-side switch (210, 212). Each high-side switch (202, 204) includes a control input (206, 208) to activate the switch. Upon activation, each high-side switch (202, 204) couples a voltage source ($V_{IN}$) to a directly coupled inductor (218). Each low-side switch (210, 212) also includes a control input (214, 216) to activate the switch. Upon activation, each low-side switch (210, 212) couples one coil of the directly coupled inductor (218) to a ground voltage.

The DC/DC converter (200) of FIG. 3 includes a coupled inductor (218). The dots depicted in the example of FIG. 3 indicate the coupled inductor (118) is a directly coupled inductor. The dot convention specifies the flow of current in a coupled inductor as such that when current flows 'into' one dot, current is induced in the alternate coil of the coupled inductor and flows 'out of' the other dot. Thus, in a directly coupled inductor, current generally flows in the opposite direction in both coils of the coupled inductor. In the example of FIG. 3, the coupled inductor (218) can receive a source input voltage level, for example, from the power-switching phases (232, 234) via a voltage source ($V_{IN}$). The coupled inductor (218) can also output an output voltage level, for example, from a voltage output ($V_{OUT}$).

The DC/DC converter (200) of FIG. 3 also includes a transient winding (220). In the example of FIG. 3, the transient winding (220) may be embodied, for example, as a separate inductor on a separate core. In such an example, the core of the transient winding (220) and the core of the inductor (218) may be aligned such that magnetic flux energy flows through either core such that the cores behave as a single core. The transient winding (220) of FIG. 3 can be utilized to impact the amount of energy that is discharged by the coupled inductor (218) as the amount of energy that is discharged by the coupled inductor (218) is dependent upon the impedance of the transient winding (220).

The example method of FIG. 3 includes determining (302) that a load to be delivered to an electrical component (306) by the DC/DC converter (200) has changed. In the example method of FIG. 3, determining (302) that a load to be delivered to an electrical component (306) by the DC/DC converter (200) has changed may be carried out, for example, by receiving a request for more or less power from the electrical component (306), through the use of current sensing technologies that can detect that the electrical component (306) has decreased the amount of power drawn from the DC/DC converter (200), and in other ways as will occur to those of skill in the art.

The example method of FIG. 3 also includes adjusting (304) the impedance level of the variable impedance switch in dependence upon the change in the load to be delivered to the electrical component (306) by the DC/DC converter (200). As described above, under ideal conditions the internal inductance of the DC/DC converter (200) would be as low as possible during a transient event as a low level of inductance allows for good dynamic performance and a faster slew rate when transitioning from delivering a load of a first amount to delivering a load of a second amount. As such, the impedance level of variable impedance switch (224) can be decreased (408) to drive down inductance in the DC/DC converter (200) when a change in the load to be delivered to the electrical component by the DC/DC converter (200) occurs. Likewise, the impedance level of variable impedance switch (224) can be increased to drive up inductance in the DC/DC converter (200) when the DC/DC converter (200) is operating at steady-state, such that the DC/DC converter (200) operates with maximum efficiency.

Figure 4:
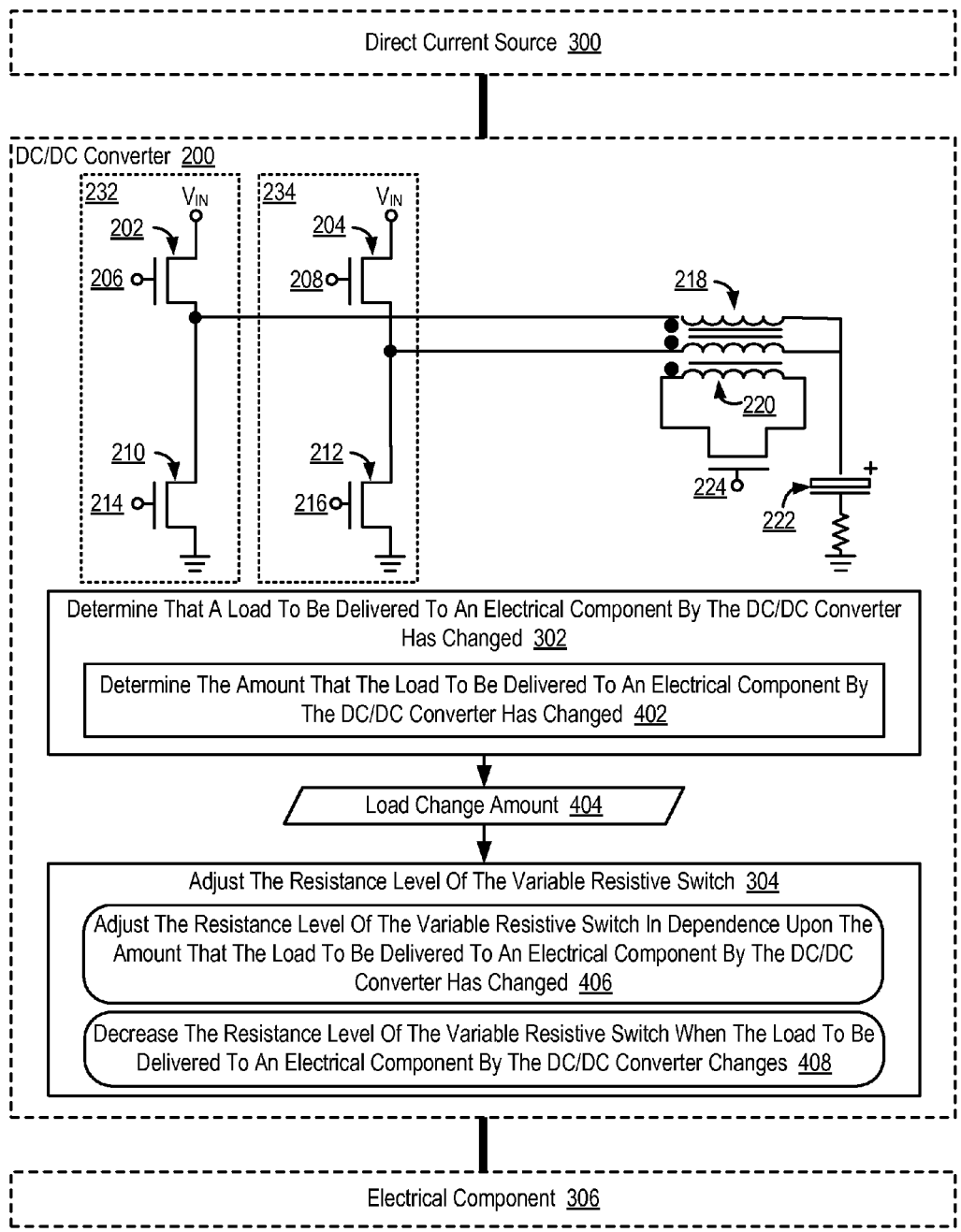
FIG. 4 sets forth a flow chart illustrating a further example method for dynamic impedance matching for improved transient performance in a DC/DC converter for delivering a load to an electrical component according to embodiments of the present invention.

For further explanation, FIG. 4 sets forth a flow chart illustrating a further example method for dynamic impedance matching for improved transient performance in a DC/DC converter (200) for delivering a load to an electrical component (306) according to embodiments of the present invention. The example method of FIG. 4 is carried out in a DC/DC converter (200) that is similar to the DC/DC converters depicted in FIG. 2 and FIG. 3, and described above. The example method of FIG. 4 is similar to the example method of FIG. 3 as it also includes determining (302) that a load to be delivered to an electrical component (306) by the DC/DC converter (200) has changed and adjusting (304) the impedance level of the variable impedance switch in dependence upon the change in the load to be delivered to the electrical component (306) by the DC/DC converter (200).

In the example method of FIG. 4, determining (302) that a load to be delivered to an electrical component (306) by the DC/DC converter (200) has changed includes determining (402) the amount (404) that the load to be delivered to an electrical component (306) by the DC/DC converter (200) has changed. In the example method of FIG. 4, determining (402) the amount (404) that the load to be delivered to an electrical component (306) by the DC/DC converter (200) has changed may be carried out by subtracting the original voltage level to be delivered to the electrical component (306) from the updated voltage level to be delivered to the electrical component (306). In such an example, if the amount (404) that the load to be delivered to an electrical component (306) by the DC/DC converter (200) has changed represents a step-down in voltage, the value will be negative. If the amount (404) that the load to be delivered to an electrical component (306) by the DC/DC converter (200) has changed represents a step-up in voltage, the value will be positive.

In the example method of FIG. 4, adjusting (304) the impedance level of the variable impedance switch (224) in dependence upon the change in the load to be delivered to the electrical component (306) by the DC/DC converter (200) includes adjusting (406) the impedance level of the variable impedance switch (224) in dependence upon the amount (404) that the load to be delivered to an electrical component (306) by the DC/DC converter (200) has changed. Consider an example in which the amount (404) that the load to be delivered to an electrical component (306) by the DC/DC converter (200) has changed represents a step-down in voltage, referred to herein as a load dump.

During a normal load dump, the impedance of the variable impedance switch (224) is dependent upon the necessary need of the load. During a high current steady state operating condition, the coupled inductor (218) stores charge within its magnetic core. The direction that the magnetic core is storing this charge, innately wants to force the remaining phase currents to flow in the opposite direction. During this load dump transient event, as the variable impedance switch (224) starts to open up, the core starts to force current through the transient loop. This current flow through the transient loop will create a negative current flow in all other phases in the system, which its current flow now supplies to the power needs of the load. The current flowing to the load, during load dump situation, induced by energy stored in the core during steady state operation, can be controlled by adjusting the slew rate at which the coupled inductor (218) is allowed to operate. Increasing or decreasing the effective inductance on the fly allows the system to supply power to the load at a rate that will not cause the system to violate needed specifications. Once the coupled inductor (218) core discharges to the load, the system will automatically resume normal operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A direct current-to-direct current ('DC/DC') converter for delivering a load to an electrical component, the DC/DC converter including:
   a coupled inductor, wherein the coupled inductor receives a source input voltage level and a outputs an output voltage level;
   a transient winding; and
   a variable impedance switch coupled to the transient winding, the variable impedance switch configured to operate by adjusting a delivered impedance level in dependence upon a determination of a change in the load to be delivered to the electrical component by the DC/DC converter including determining an amount that the load to be delivered to an electrical component by the DC/DC converter has changed and adjusting the impedance level of the variable impedance switch in dependence upon the amount that the load to be delivered to an electrical component by the DC/DC converter has changed.

2. The DC/DC converter of claim 1 wherein the variable impedance switch is a variable resistor.

3. The DC/DC converter of claim 1 wherein the variable impedance switch is a metal-oxide-semiconductor field-effect transistor ('MOSFET').

4. The DC/DC converter of claim 1, wherein adjusting the delivered impedance level in dependence upon the change in the load to be delivered to the electrical component by the DC/DC converter includes decreasing the impedance level of the variable impedance switch when the load to be delivered to an electrical component by the DC/DC converter changes.

* * * * *